Jan. 29, 1963  F. P. HEALY ET AL  3,075,413
AUTOMOTIVE BRAKE DRUM LATHE

Filed Dec. 3, 1959  3 Sheets-Sheet 1

INVENTORS
FRANCIS P. HEALY
EDWARD A. ALLEN
BY *Teller & McCormick*
ATTORNEYS

Jan. 29, 1963   F. P. HEALY ET AL   3,075,413
AUTOMOTIVE BRAKE DRUM LATHE
Filed Dec. 3, 1959   3 Sheets-Sheet 2

INVENTORS
FRANCIS P. HEALY
EDWARD A. ALLEN
BY *Teller & McCormick*
ATTORNEYS

Jan. 29, 1963   F. P. HEALY ET AL   3,075,413
AUTOMOTIVE BRAKE DRUM LATHE
Filed Dec. 3, 1959   3 Sheets-Sheet 3
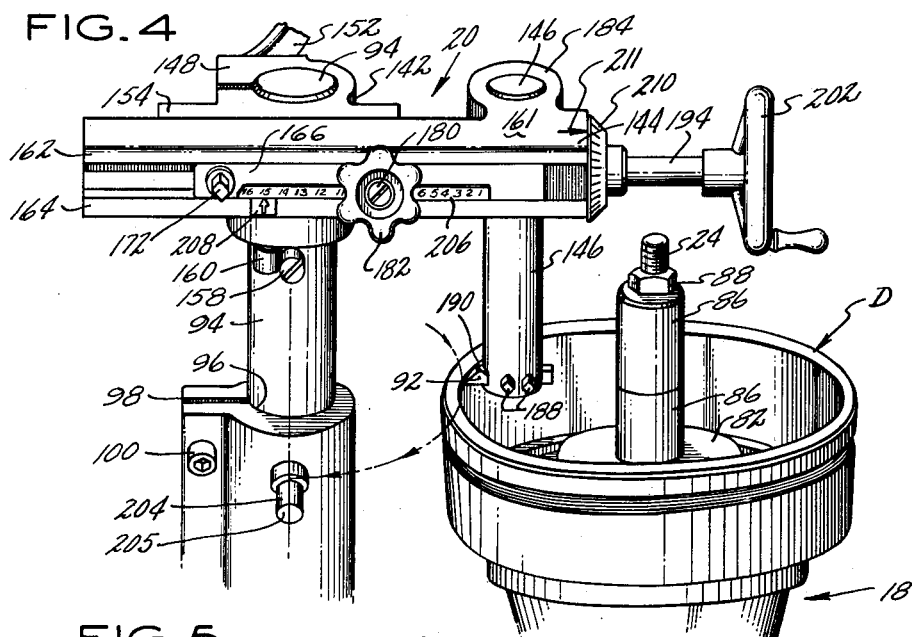
INVENTORS
FRANCIS P. HEALY
EDWARD A. ALLEN
BY Teller & McCormick
ATTORNEYS

United States Patent Office 3,075,413
Patented Jan. 29, 1963

3,075,413
AUTOMOTIVE BRAKE DRUM LATHE
Francis P. Healy, Springfield, and Edward A. Allen, Westfield, Mass., assignors to Universal American Corporation, Wilmington, Del., a corporation of Delaware
Filed Dec. 3, 1959, Ser. No. 857,163
4 Claims. (Cl. 77—4)

This invention relates to special purpose machinery and, more specifically, to a lathe particularly adapted for machining worn brake shoe engaging surfaces of automotive brake drums.

It is the general object of the invention to provide a special purpose lathe of the type mentioned which is adapted to facilitate the accurate machining of the shoe engaging surface of a brake drum to a selected diameter and to facilitate the machining of the shoe engaging surfaces of a number of similar brake drums to precisely the same diameter.

A further object of the invention is to provide an automotive brake drum lathe which includes means for locating a cutting tool a known radial distance from the axis of a brake drum held in the lathe and means for indicating the extent of subsequent radial movement of the tool whereby to facilitate the accurate machining of the aforesaid brake drum surface.

A still further object of the invention is to provide an automatic brake drum lathe of the type mentioned wherein a brake drum may be conveniently held and rotated as required for machining with its axis extending vertically and with its open end facing upwardly.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 4 is a perspective view showing a tool support means included in the upper portion of the lathe of FIG. 1;

FIG. 5 is a horizontal sectional view taken as indicated by the line 5—5 in FIG. 1 and showing a tool slide which forms a part of the tool support means;

FIG. 6 is a left-hand side elevation of the tool slide of FIG. 5; and

FIG. 7 is a vertical section through the tool slide taken as indicated by the line 7—7 in FIG. 5.

Figure 1:
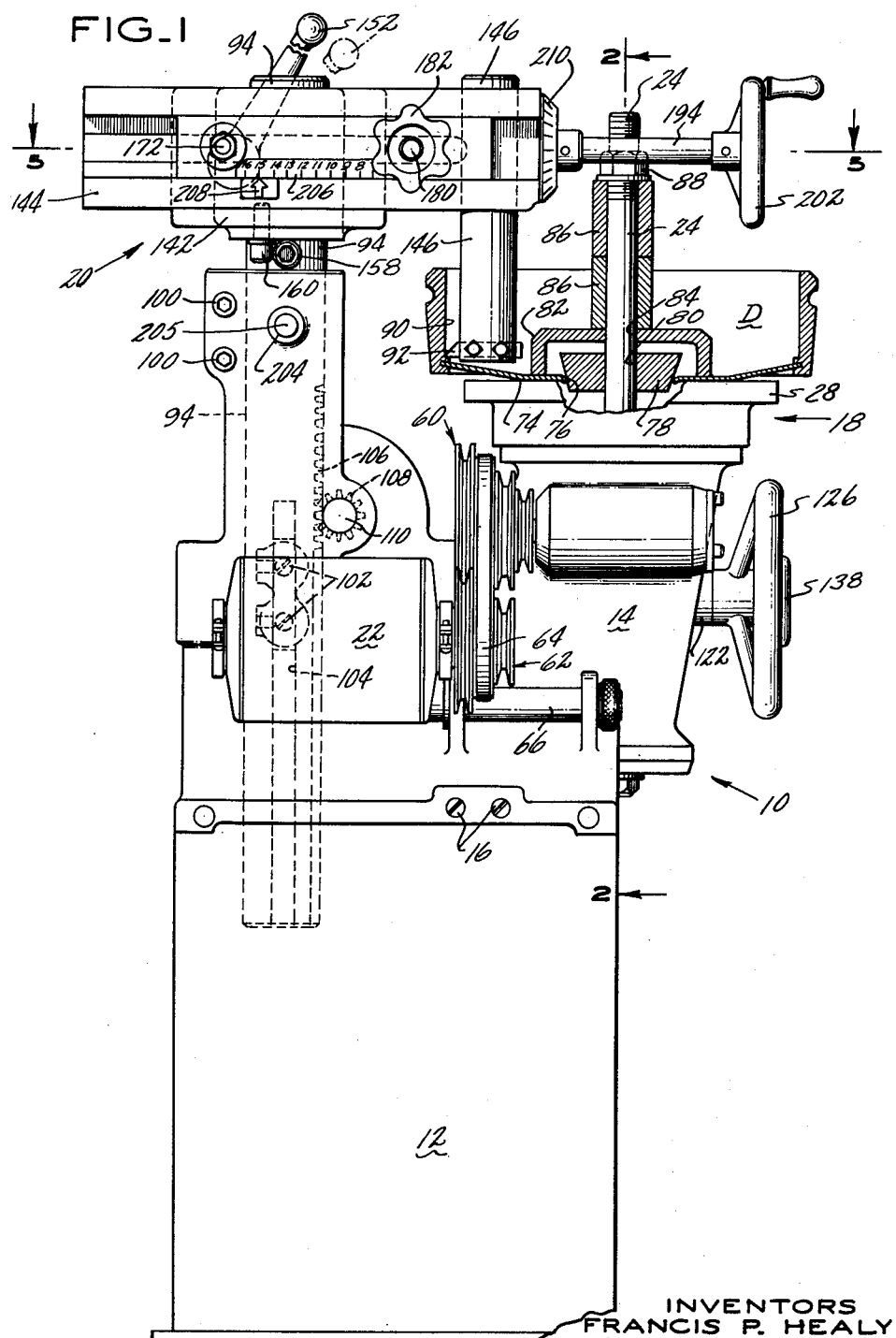
FIG. 1 is a front elevational view of the automotive brake drum lathe of the present invention.

Referring particularly to FIG. 1 of the drawings, it will be observed that the automotive brake drum lathe of the present invention comprises an upright housing indicated generally at 10 and which includes lower and upper sections 12 and 14. The lower housing section 12 is adapted to stand on a floor or other flat surface and serves merely to support the upper housing section 14. Said lower housing section may obviously take a variety of forms, but is preferably of a generally square horizontal cross section and of cast construction. The upper housing section 14 is of irregular form and is secured to the lower section 12 by suitable bolts 16, 16. Said housing section may also be of cast construction. A right-hand portion thereof supports and partially encloses a fixture indicated generally at 18 and adapted to hold an automotive brake drum such as the drum D. A rear left-hand portion of the upper housing section 14 supports and partially encloses a tool support means indicated generally at 20 and mounted on a front left-hand portion of the said housing section is an electric motor 22 which supplies the power for operating the lathe.

The fixture 18 is adapted to hold and to rotate a brake drum such as the drum D with its axis extending vertically and with its open end facing upwardly as shown in FIG. 1. As will be explained below, brake drums of various sizes may be quickly and conveniently mounted on the fixture 18 so that the drum axis extends vertically and coincides with the vertical axis of the fixture. Rotation of the brake drum about its axis may obviously be accomplished thereafter by rotating the said fixture about its axis.

Figure 2:
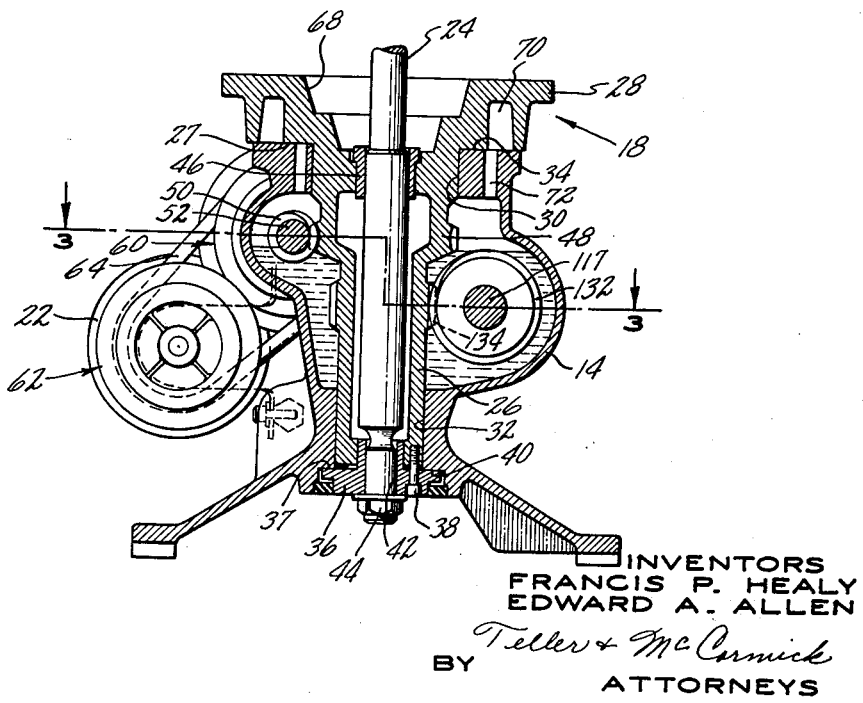
FIG. 2 is a vertical sectional view taken as indicated by the line 2—2 in FIG. 1.

As best illustrated in FIG. 2, the fixture 18 comprises a vertical spindle 24 which is supported by and which is rotatable with a sleeve 26. The sleeve 26 is formed integrally with a circular table 28 at its upper end portion and is supported for rotation within suitable bores 30 and 32 formed respectively in upper and lower end portion of the housing section 14. An upper horizontal bearing surface is provided on the housing section 14 at 34 and said surface engages a horizontal bearing surface 27 on a lower portion of the table 28. At the lower end portion of the sleeve 26 an end cap 36 is secured thereto by means of one or more screws 38 and has a surface 37 which engages a lower horizontal bearing surface 40 formed on the housing section 14. The lower end portion of the spindle 24 extends downwardly through a suitable bore 42 in the end cap 36 and has a nut 44 threaded thereon which engages the end cap 36 to prevent upward movement of the spindle. A collar 46 disposed within the sleeve 26 adjacent the table 28 receives the spindle 24 and prevents chips and the like from passing downwardly therealong.

Figure 3:
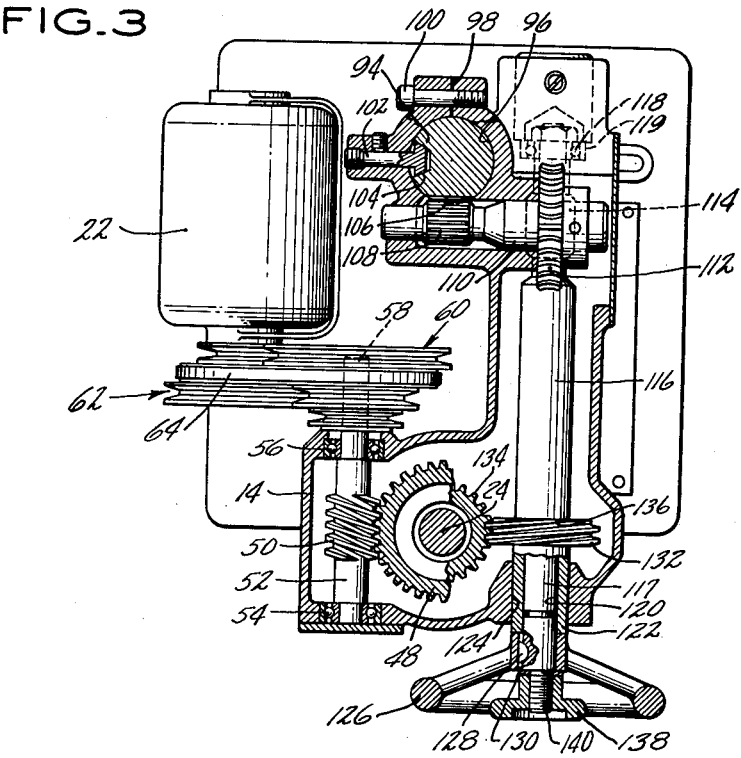
FIG. 3 is a horizontal sectional view taken in steps as indicated generally by the line 3—3 in FIG. 2.

As best illustrated in FIG. 3, a worm gear 48 is formed integrally on the sleeve 26 and meshes with and is driven by a worm 50 formed on a horizontal shaft 52. The shaft 52 is rotatably supported by ball bearing units 54 and 56 disposed in siutable bores in the upper housing section 14 and said shaft has an end portion 58 thereof which projects outwardly from said housing section. Mounted on the projecting end portion 58 of the shaft 52 is a cone set of pulleys 60 which may be connected with a second cone set of pulleys 62 mounted on the drive shaft of the aforementioned motor 22 by a suitable belt 64. As best illustrated in FIG. 1, the motor 22 is mounted on a horizontal slide bar 66 so as to be moved as required to vary the relative horizontal position of the pulleys of the cone sets 60 and 62 and permit selection of a desired speed of rotation for the shaft 52. This of course permits selection of a desired speed of rotation for the spindle 24, the sleeve 26, the table 28, and a drum such as the drum D mounted on said table.

The table 28 is preferably provided with a generally conical centrally located opening 68 as best shown in FIG. 2 and the upper surface thereof is preferably substantially flat so that brake drums may be placed thereon with their open ends facing upwardly and their end walls flatly in engagement with said surface. An annular recess 70 extends upwardly from the lower surface 27 of the table 28 and cooperates with an annular passageway 72 in the housing portion 14 to provide an opening for the splash lubrication of the horizontal bearing surfaces 27 and 34, the housing section 14 preferably being filled with lubricating fluid to a level somewhat below passageway 72 as illustrated in FIG. 2.

Referring to FIG. 1, it will be observed that an end wall 74 of the brake drum D is provided with a centrally located circular opening 76 in the conventional manner.

A centering cone 78 disposed within and in engagement with the edge of the opening 76 has a centrally located bore 80 which receives an upper end portion of the spindle 24. Obviously, the brake drum D may be conveniently centered on the table 28 so that its axis will coincide with the axis of the spindle 24 and the sleeve 26 by means of the said centering cone. That is, the drum may be placed on the table 28 with its open end facing upwardly and with its axis approximately coinciding with the axis of the spindle. The centering cone 78 may then be moved downwardly over the spindle 24 and entered in the opening 76 in the end wall 74 of the brake drum and the table opening 68 to precisely locate the drum so that its axis and the axis of the spindle will coincide. Obviously, a number of centering cones of different sizes may be provided for similar use with brake drums differing in size from the drum D.

A means for securely holding the brake drum in place after it has been precisely centered on the fixture may take various forms, but preferably comprises a clamp member 82 which is shown as being generally cup-shaped and provided with a central opening 84. The spindle 24 is received in the opening 84 with the clamp member inverted and with its open end edge portion engaging the end wall of the brake drum as shown. One or more spacer members 86, 86 (two shown) may be disposed above the clamp member 82 and urged downwardly into engagement therewith by a clamping nut 88 turned onto a threaded upper end portion of the spindle 24.

It will be apparent that automotive brake drums of various sizes may be quickly and conveniently centered on the fixture 18 with the brake drum and fixture axes coinciding. Thereafter, the fixture may be rotated in the manner described to permit the inner cylindrical shoe-engaging surface of the drum, such as the surface 90 of the drum D, to be engaged and machined by a cutting tool. A tool 92 is shown engaged with the surface 90 of the drum D in FIG. 1 adjacent the lower portion of said drum and the end wall 74. Obviously, feed movement of the tool axially of the brake drum will be required in machining the surface 90 thereof and with the tool positioned as shown in FIG. 1, it must be fed vertically upwardly to machine the said surface.

In the preferred embodiment of the invention shown, the aforementioned tool support means 20 includes a vertically extending support rod or post 94 which carries the remaining elements of the tool support means and which is movable vertically. More specifically, the support rod or post 94 is adapted to be moved vertically upwardly to provide the desired feed movement of the tool 92 upwardly along the shoe-engaging surface 90 of the brake drum D. As best illustrated in FIG. 3, the support rod or post 94 is preferably substantially circular in cross section and is received in a suitable bore 96 formed in the rear left-hand portion of the upper housing section 14. The post 94 is slidable vertically in the bore 96 and the housing section 14 is split vertically at 98 adjacent the bore 96 to provide for adjustment of the sliding friction encountered by the said post. That is, clamping screws 100, 100 associated with the split portion of the housing section 14 may be turned to adjust the diameter of the bore 96 whereby to effect such frictional adjustment. A key 102 cooperates with a keyway 104 in the post 94 to prevent rotation of said post in the bore 96 and there is also formed in said post a vertically extending series of rack teeth 106 (FIG. 1). As will be seen, the rack teeth 106 are engaged by the teeth of a pinion 108 to effect vertical movement of the post 94 whereby to effect feed movements and other vertical movements of the cutting tool 92.

The pinion 108 is formed on a sub shaft 110 which extends horizontally and which is suitably journaled in the upper housing section 14 as best shown in FIG. 3. Also formed on the stub shaft 110 is a worm gear 112 which meshes with and which is driven by a worm 114. The worm 114 is formed on a horizontally extending shaft 116 which is journaled at one end in ball bearing units 118 supported in a suitable bore 119 in the housing section 14 and which has a reduced diameter portion 117 adjacent its opposite end journaled in a bore 120 of a sleeve 122. The sleeve 122 is rotatably and slidably received within a bore 124 formed within the housing section 14 and is fixedly connected to a handwheel 126 at its outer end portion. The handwheel 126 is connected to the reduced diameter portion 117 of the shaft 116 by means of a key 128 so as to be rotatable therewith and slidable relative thereto, a keyway 130 cooperating with said key being of sufficient length to accommodate such relative sliding movement. The inner end portion of the sleeve 122 is disposed adjacent a worm gear 132 which is mounted loosely on the reduced diameter portion 117 of the shaft 116.

The worm gear 132 is continuously engaged with and driven by a worm 134 formed on the aforementioned fixture sleeve 26 and said gear is adapted selectively to rotate the shaft 116 for elevation of the post 94 and feed movements of the cutting tool 92. The inner radial face of the worm gear 132 is disposed adjacent a shoulder 136 formed on the shaft 116 at the junction of the reduced diameter portion 117 of said shaft with the remaining portion thereof. The outer radial face of said gear is disposed adjacent the inner end portion of the sleeve 122 and is adapted to be engaged by said sleeve end portion to clamp the gear 132 between the same and the shoulder 136, the said sleeve, the handwheel 126, and the shaft 116 thus being rotated with the gear. Inward sliding movement of the sleeve 122 to clamp the gear 132 may obviously be conveniently effected by suitable rotation of a knob 138 which is disposed on a threaded end portion 140 of the shaft 116 and which engages the outer end portion of the said sleeve. When the sleeve 122 is permitted to slide outwardly along the shaft 116 by suitable rotation of the knob 138 releasing clamping pressure of the sleeve 122 on the gear 132, the said gear may turn freely about the shaft 116.

From the foregoing, it will be apparent that the required upward feed movement of the cutting tool 92 can be initiated by turning the knob 138 as required to urge the handwheel 126 and the sleeve 122 inwardly to clamp the gear 132 securely between said sleeve and the shoulder 136. Ensuing rotation of the shaft 116 will result in driving of the worm gear 112 by the worm 114 and in rotation of the pinion 108 causing the post 94 to be moved upwardly to elevate the tool 92. With the knob 138 turned to release the clamping action of the sleeve 122 on the gear 132, the said gear will be rotated about the reduced diameter portion 117 of the shaft 116 with little or no tendency to turn said shaft. Manual rotation of the handwheel 126 may thereupon be effected to raise or lower the post 96, the other elements of the tool support means, and the cutting tool 92 as desired.

In addition to the vertical support rod or post 94, the tool support means 20 of the brake drum lathe comprises a tool holder which preferably includes a slide support member 142, a tool slide 144, and a tool bar 146. As best illustrated in FIG. 4 et sequa, the slide support member 142 is shown as comprising a split collar portion 148 which is adapted to receive the upper end portion of the support post 94. An adjusting or clamping screw 150 for expanding and contracting the collar portion 148 and thus adjusting the frictional forces between the same and the post 94 is provided and has a handle 152 for convenient manipulation. Formed integrally with the said collar portion of the slide support member is a horizontally extending portion 154 thereof which forms a guideway 156 for the tool slide 144. The guideway 156 extends laterally of the line of movement of the post 94 and, in the embodiment of the invention shown, said guideway is substantially horizontal. The head of a screw 158 which is entered in a suitably threaded opening in the upper end portion of the post 94 engages and serves to prevent downward sliding movement of the slide support member along the post 94 on loosening of the adjusting screw 150. In addition, the head of said screw cooperates with the head of a screw 160 entered in the portion 154 of the slide support member to act as a stop means and to limit rotation of the slide support member about the support post. The reason for so limiting rotation of the slide support member will be set forth hereinbelow.

The tool slide 144 which is movable along the horizontal guideway 156 comprises a bifurcated member having a connecting body portion 161 and upper and lower horizontally extending legs 162 and 164. The latter of these legs rests on and slides along the guideway 156. A horizontally extending clamping plate 166 has upper and lower edge portions entered in horizontally extending grooves 168 and 170 formed respectively in the upper and lower legs 162 and 164 of the tool slide and a connecting screw 172 extends through a suitable opening in said clamping plate and into a suitably threaded opening 174 in the slide support member 142. Said connecting screw is preferably turned into the opening 174 only far enough to hold the clamping plate properly in place in the grooves 168 and is not intended to serve as a binder screw holding the tool slide in a fixed position along the guideway 156. A binder device is provided and comprises a stud 176 secured to the slide support member 142 by means of a nut 178 and provided with a threaded portion 180 which extends outwardly through the clamping plate 166 and carries a binder knob 182. The binder knob 182 may be turned onto the threaded end portion 180 of the stud 176 to urge the clamping plate 166 inwardly into tight engagement with the grooves 168 and 170 and thus hold the tool slide in a selected position along the guideway 156.

The aforementioned body portion 161 of the bifurcated member of the tool slide has formed integrally therewith a collar 184 which is adapted to receive and adjustably hold the upper end portion of the tool bar 146, the said bar depending therefrom with the cutting tool 92 held in a lower end portion thereof. A binder screw 186 secures the tool bar 146 in adjusted position in the collar 184 and a pair of binder screws 188, 188 secure the cutting tool 92 in adjusted position in a horizontal tool slot or notch 190 formed in the lower end portion of the tool bar 146.

Preferably the body portion 161 is also provided with a horizontally extending bore 192. A lead screw 194 projects inwardly through said bore 192 and is fixed against axial movement relative to said body portion by a set screw 196 which projects into an annular recess 198 in the lead screw. The lead screw 194 has a threaded inner end portion which extends through threaded opening 200 in an enlarged central portion of the aforementioned stud 176 which is secured to the slide support member 142. At an outer end portion thereof the lead screw 194 is provided with a handwheel 202. Thus, the tool slide 144 may be moved back and forth along the guideway 156 by turning the handwheel 202 to rotate the lead screw 194 within the threaded opening 200 of the member 176.

From the foregoing, it will be apparent that the cutting tool 92 may be conveniently moved vertically and parallel to the axis of a brake drum held by the fixture 18 by rotation of the handwheel 126. Rotation of the handwheel 202 effecting movement of the tool slide 144 along the guideway 156 will result in movement of the cutting tool in a generally radial direction with respect to the axis of a brake drum held by the fixture 18. Thus, the cutting edge of the tool may be moved to the position shown in FIG. 1 for machining the surface 90 of the brake drum D. Thereafter, the knob 138 may be rotated as required to initiate upward feed movement of the cutting tool to machine the said drum surface as desired.

In accordance with the invention, the automotive brake drum lathe is provided with a tool locating means which can be engaged by the cutting edge of a tool held by the tool bar 146 to locate the said cutting edge a known radial distance from the axis of a brake drum held by the fixture 18. There is also provided a scale means which is adapted to indicate the extent of generally radial movement of the tool cutting edge from its located position and thus indicate the distance between said cutting edge and the drum axis. Thus, it will be seen that a cutting tool can be accurately located so that a shoe-engaging surface of a brake drum can be turned to a selected diameter with a high degree of accuracy and without separate and independent means for measuring the diameter. Further, a number of similar brake drums may have their shoe-engaging surfaces ground to the same diameter with a high degree of accuracy.

While the tool locating means may take various forms within the scope of the invention, said means preferably comprises a locating pin 204 provided on a front left-hand portion of the upper housing section 14 adjacent the vertical support post 94. The locating pin 204 preferably has a flat end surface 205 which is ground or otherwise accurately located a known radial distance from the axis or line of movement of the support rod or post 94. Obviously, the cutting edge of a tool, such as the tool 92, may be located a known radial distance from the said axis or line of movement by engaging the said cutting edge with the end surface of the locating pin 204. Moreover, the cutting edge of such a tool may be located a known radial distance from the axis of a brake drum held by the fixture 18 by so locating the cutting edge with the pin end surface 205, the distance between the axis of such a brake drum and the axis or line of movement of the post 94 being known.

In FIG. 4 the cutting tool 92 and the elements supporting the same are shown in a first angular position about the support post 94 wherein the guideway 156 extends substantially parallel with a connecting line between the axis of a brake drum such as the drum D on the fixture 18 and the axis or line of movement of the post 94. The tool 92 can obviously be engaged with the surface 90 of the braked rum D approximately on said connecting line by suitable radial tool movement effected by rotation of the handwheel 202 and vertical tool movement effected by rotation of the handwheel 126. The aforementioned stop means comprising the heads of the screws 158 and 160 limits the rearward rotation of the slide support member 142 as illustrated in FIG. 4 to establish this first angular position of the cutting tool and its supporting elements.

From the first angular position shown in FIG. 4, the cutting tool 92 may be swung forwardly to a second angular position by rotating the slide support member 142, the tool slide 144 and the tool bar 146 forwardly about the support post 94. In this second angular position of the tool, it is swung clear of the brake drum and its cutting edge may be engaged with the flat end surface 205 of the pin 204 to locate the same a known radial distance from the axis or line of movement of the post 94. The stop means comprising the heads of the screws 158 and 160 are inoperative in this position of the tool, the screw 160 being rotated rearwardly with the slide support 142 away from the screw 158.

From the foregoing, it will be apparent that the cutting edge of a tool such as the tool 92 may be located a known radial distance from the axis of the post 94 with the said tool in its second angular position. Thereafter, the tool may be swung to its first angular position and the cutting edge thereof will reside a known radial distance from the axis of a brake drum or the fixture 18. In the embodiment of the invention shown, the flat end surface 205 of the pin 204 is spaced from the axis of the post 94 to provide for location of the cutting edge of a tool, such as the tool 92, 7½ inches from the axis of a brake drum on the fixture 18. Thus, a cutting tool located with the use of the pin 204 and then swung back to its first position will provide a 15 inch diameter on the shoe-engaging surface of a brake drum.

The scale means mentioned above and which is adapted to indicate the extent of generally radial movement of the tool cutting edge from its located position may take various forms within the scope of the invention. Preferably and as shown, a scale 206 is provided on the clamping plate 166 and extends adjacent the lower leg 164 of the tool slide 144. A pointer 208 affixed to the said lower leg 164 of the tool slide moves along the scale 206 with movement of the tool slide along the guideway 156. The indicia on the scale 206 may vary also, but preferably a series of numerals is provided thereon for indicating brake drum diameters directly. That is, the scale preferably includes a series of numerals corresponding to the diameters of brake drums which the lathe is adapted to accommodate, the lathe shown being adapted to accommodate brake drums varying in diameter from 6 to 16 inches and the numerals 6 to 16 appearing accordingly on the scale 206. The numerals are spaced from each other along the scale so that a 2 to 1 ratio is established, i.e., one inch radial movement of the cutting tool effected by a one inch movement of the tool slide 144 along the guideway 156 results in movement of the pointer 208 a distance of two numerals on the scale. Thus, the diameter of the surface which will be provided by the cutting edge of the tool 92 can be readily determined after the said cutting edge has been located by means of the pin 204 and the reading of the scale has been taken to coordinate the same with the said located position of the cutting edge.

Preferably a second scale means is also included and said scale means may take the form of a dial 210 mounted on and adapted to be rotated with the lead screw 194. As shown, the dial 210 is located adjacent the body portion of the slide 144 and cooperates with an index mark or pointer 211 on said body portion to indicate decimal parts of an inch. Preferably the dial 210 is graduated in thousandths of an inch and is provided with a zero mark which is coordinated with the scale 206 so that it registers with the index mark 211 when the pointer 208 registers with a numeral on said scale.

The manner in which the located pin 204, the scale means 206, and the dial 210 are utilized in establishing the position of the cutting edge of a tool held by the bar 146 is suggested by the above and needs only a brief description. A sharpened cutting tool may be placed in the slot or notch 190 and the binder screws 188 may be partially tightened so as to retain the tool in the slot, but at the same time permit lengthwise sliding movement thereof under the influence of a nominal force. The handwheel 202 may then be rotated to move the tool slide 144 along the guideway 156 to the numeral 15 and to rotate the zero on the dial 210 into registry with the pointer or index mark 211 on the body portion of the slide. The slide support member 142, the tool slide 144, and the tool bar 146 may then be rotated forwardly about the vertical support post 94 to swing the tool to its second angular position and move its cutting edge to a position adjacent the end surface 205 of the locating pin 204. The tool cutting edge may then be engaged with the pin surface 205 by sliding the tool lengthwise in the slot or notch 190 as required and the binder screws 188, 188 may be further tightened to fix the cutting tool in position. The cutting tool may then be swung rearwardly to its first position whereupon the cutting edge thereof will be located precisely 7½" from the axis of the brake drum to provide for a 15" diameter of the shoe-engaging surface thereof. The handwheel 202 may then be rotated to provide for clearance whereupon the handwheel 126 may be rotated to lower the post 94 and lower the cutting tool to the starting position as shown in FIG. 1. Further rotation of the handwheel 202 may then be effected to provide for a machining cut of a desired number of thousandths of an inch as indicated by the dial 210. Tightening of the knob 138 will initiate upper feed movement of the cutting tool whereupon the shoe-engaging surface of the brake drum will be machined as desired, one or more additional machining cuts to provide the precise diameter desired being obtainable with a similar procedure.

It will be apparent that a number of brake drums may be machined with a high degree of accuracy to selected diameters before resharpening of the cutting tool is required. The cutting edge of the tool may be moved to the proper position for a selected brake drum diameter quickly and conveniently merely by rotating the handwheel 202 and viewing the scale 206 and the dial 210. Obviously, a number of similar brake drums may be machined to the same diameter merely by repeating the setting of the cutting tool as reflected in the readings taken from the scale 206 and the dial 210. When resharpening of the cutting tool is required, its cutting edge may be located by engagement with the pin 204 in the manner described above and the said edge may thereafter be located as desired by means of the scale 206 and the dial 210.

From the foregoing, it will be apparent that an automotive brake drum lathe has been provided wherein brake drums of various diameters may be quickly and conveniently mounted on a power operated rotatable fixture. A cutting tool may thereafter be brought into engagement with the shoe-engaging surface of the brake drum to machine the said surface to a selected diameter with a high degree of accuracy. Location of the cutting edge of the tool may be accomplished quickly and conveniently and without the assistance of separate or independent measuring means. The operator of the lathe need merely rotate a handwheel and view a scale to establish the desired location of the tool cutting edge in a highly efficient manner.

The invention claimed is:

1. In a lathe for machining automotive brake drums or the like, the combination of a power operated fixture adapted to hold a brake drum or the like and rotate the same about its axis, a support rod movable along a line parallel with the axis of a brake drum held by said fixture, a tool holder supported by said rod and adapted to move a cutting tool generally radially toward and away from said drum axis and angularly about said rod to a first position wherein the tool can be engaged with a drum on said fixture by generally radial movement and to a second position wherein the tool is swung clear of the drum, means adapted to stop said tool holder at said first position on angular movement thereof from said second position, a tool locating means mounted on the lathe and which can be engaged by a cutting edge of a tool held in said second position to locate said cutting edge a known radial distance from the line of movement of said support rod whereby to locate said cutting edge a known radial distance from the aforesaid drum axis when the tool is moved angularly about said rod to said first position, and a scale on said tool holder adapted to indicate the extent of generally radial movement of said cutting tool edge from its located position whereby to indicate the radial distance between said cutting edge and said drum axis.

2. In a lathe for machining automotive brake drums, the combination of a power operated fixture adapted to hold and rotate a brake drum with its axis extending vertically and its open end facing upwardly, a vertically extending and vertically movable support rod spaced horizontally from the axis of a brake drum held by said fixture, a slide support member having a horizontally extending guideway mounted on said support rod for vertical movement therewith and for rotation thereabout between first and second angular positions, said guideway extending parallel with a horizontal connecting line between said drum axis and the line of movement of said support rod with said slide support member in said first angular position, means adapted to stop said guideway at said first position on rotation thereof from said second position, a tool slide mounted on and movable along said guideway above the open end of a brake drum held by said fixture, a vertically extending tool bar depending from said slide and adapted to hold a cutting tool at its lower end portion so that it can be engaged with the inner cylindrical surface of a brake drum held by said fixture approximately on the aforesaid connecting line with the slide support member in said first angular position, a tool locating means mounted on the lathe and which can be engaged by the cutting edge of a tool with said slide support member in said second angular position to locate said cutting edge a known radial distance from the line of movement of said support rod whereby to locate said cutting edge a known radial distance from the axis of a drum held by said fixture with said support member in said first position, and coordinated first and second scales adapted respectively to indicate large and small increments of movement of said tool slide along said guideway whereby to indicate the extent of movement of said tool cutting edge from its located position and thus indicate the distance between said cutting edge and said drum axis.

3. In a lathe for machining automotive brake drums, the combination of a rotatable fixture adapted to hold a brake drum with its axis extending vertically and its open end facing upwardly, a vertically extending and vertically movable support rod spaced horizontally from the axis of a brake drum held by said fixture, a slide support member having a horizontally extending guideway mounted on said support rod for vertical movement therewith and rotation thereabout, stop means adapted to limit rotation of said support member about said rod in one direction with said guideway parallel with a horizontal connecting line between said drum axis and the line of movement of said support rod, a tool slide mounted on and movable along said guideway above the open end of a brake drum held by said fixture, a vertically extending tool bar depending from said slide and adapted to hold a cutting tool at its lower end portion so that it can be engaged with the inner cylindrical surface of a brake drum held by said fixture approximately on the aforesaid connecting line with the slide support member engaging said stop means, tool locating means which can be engaged by the cutting edge of a tool when said slide support member is rotated away from said stop means to swing the tool clear of a drum on said fixture, said locating means being adapted to locate a tool cutting edge engaged therewith a known radial distance from the line of movement of said support rod whereby to locate the cutting edge a known radial distance from the axis of a drum held by said fixture with said slide support member in engagement with said stop means, a scale adapted to indicate the horizontal position of said tool slide along said guideway whereby to indicate the extent of movement of said tool cutting edge from its located position and thus indicate the distance between said cutting edge and said drum axis, and power operated means operatively connected with said fixture to rotate the same whereby to rotate the brake drum about its axis, said means being operatively connected also with said support rod to move the same vertically whereby to feed a cutting tool held by said tool bar axially along the said inner cylindrical surface of the brake drum.

4. In a lathe for machining automotive brake drums or the like, the combination of a power operated fixture adapted to hold a brake drum or the like and rotate the same about its axis, a support rod movable along a line parallel with the axis of a brake drum held by said fixture, a tool holder supported by said rod and adapted to move a cutting tool generally radially toward and away from said drum axis and angularly about said rod to a first position wherein the tool can be engaged with a drum on said fixture by generally radial movement and to a second position wherein the tool is swung clear of the drum, means adapted to stop said tool holder at said first position on angular movement thereof from said second position, a tool locating means mounted on the lathe and which can be engaged by a cutting edge of a tool held in said second position to locate said cutting edge a known radial distance from the line of movement of said support rod whereby to locate said cutting edge a known radial distance from the aforesaid drum axis when the tool is moved angularly about said rod to said first position, and coordinated first and second scales on said tool holder adapted respectively to indicate large and small increments of generally radial movement of said cutting tool edge from its located position whereby to indicate the radial distance between said cutting edge and said drum axis.

References Cited in the file of this patent
UNITED STATES PATENTS

| 1,698,971 | Smith | Jan. 15, 1929 |
| 1,796,042 | Muller | Mar. 10, 1931 |
| 2,142,710 | Bigelow | Jan. 3, 1939 |
| 2,458,472 | Irwin | Jan. 4, 1949 |
| 2,533,024 | Lustrik | Dec. 5, 1950 |
| 2,569,873 | Stacey | Oct. 2, 1951 |

FOREIGN PATENTS

| 1,124,121 | France | Oct. 4, 1956 |